No. 660,602. Patented Oct. 30, 1900.
T. R. TIMBY.
METHOD OF RIPENING COFFEE.
(Application filed Feb. 9, 1900.)
(No Model.)
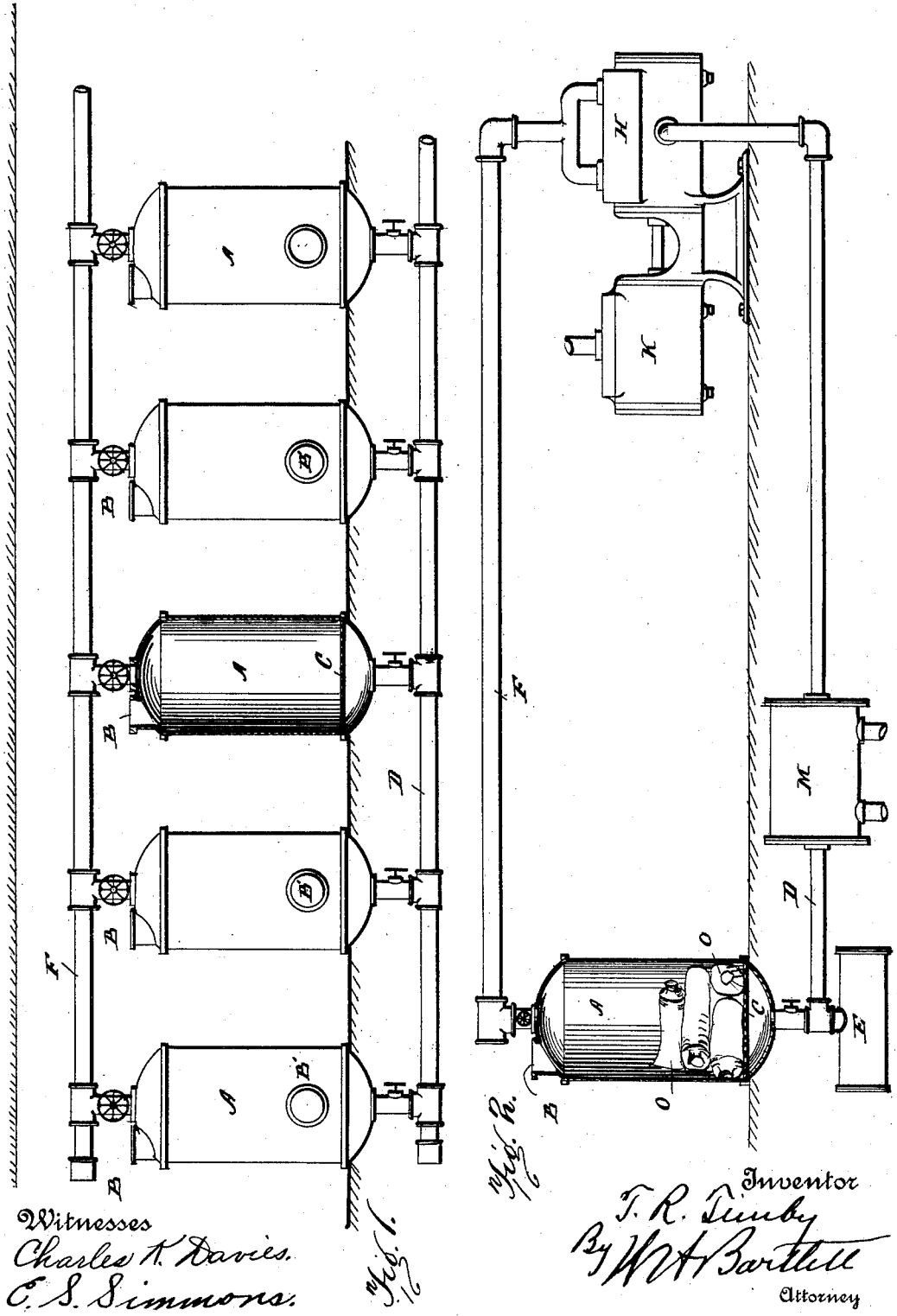
Witnesses
Charles N. Davies.
C. S. Simmons.
Inventor
T. R. Timby
By W. H. Bartlett
Attorney

UNITED STATES PATENT OFFICE.

THEODORE R. TIMBY, OF NEW YORK, N. Y.

METHOD OF RIPENING COFFEE.

SPECIFICATION forming part of Letters Patent No. 660,602, dated October 30, 1900.

Application filed February 9, 1900. Serial No. 4,595. (No specimens.)

*To all whom it may concern:*

Be it known that I, THEODORE R. TIMBY, a citizen of the United States, residing at 101 Lafayette avenue, New York city, borough of Brooklyn, in the county of Kings and State of New York, have invented certain new and useful Improvements in Methods of Ripening Coffee, of which the following is a specification, reference being had therein to the accompanying drawings.

This invention relates to a method of ripening or coloring raw coffee.

Coffee in berries or kernels when stored under proper conditions increases in value when stored for several seasons, owing either to a ripening or drying action or to some other reason or reasons.

Coffee treated by the present invention improves in flavor and color and apparently in strength, and the treatment of a few hours or days by the method I will describe has a similar effect to the natural action of aging for several seasons and has a further effect of removing dust, odor, and impurities and ripening or seasoning to any desired extent.

Figure 1 is an elevation and partial section of a mechanism which may be employed in carrying out my process. Fig. 2 is a vertical section of a coffee-receptacle, showing connections by which the air may be drawn from or be forced into such receptacle.

A indicates a strong metallic receptacle, preferably a cylinder, and capable of resisting a considerable air-pressure, either external or internal. The cylinder or receptacle A should have large manholes B B' above and below, which manholes have air-tight covers, attached in usual manner. A perforated flooring C, near the bottom of the cylinder, permits the entrance of air from below and permits the escape of dust. An air-pipe D enters the arched head of the cylinder below the perforated flooring C, and a dust-trap E provides a receptacle for the dust which may escape through floor E. This dust-trap has any usual means for cleansing. The upper end of the cylinder has an air-pipe F, by which the air may be exhausted in considerable degree from the cylinder A. Both pipes D and F are provided with cocks or valves, by which cocks the passage of air through either passage may be controlled or stopped.

H indicates an air-pump, which may act either as a compression or an exhaust pump, and K denotes the engine by which the air-pump is driven. Any convenient form of engine and air pump or compressor may be used.

As indicated in Fig. 1, any convenient number of cylinders or receptacles A may be used, each receptacle being connected with a pipe or passage by which air may be forced in under pressure and a pipe or passage by which air may be withdrawn.

The air-supply pipe D may pass through a cylinder or receptacle M, in which steam or hot water may circulate to heat the air in pipe D, or a cooling liquid may circulate in contact with pipe D to cool the air within.

The mechanism I have described is merely exemplary. The important conditions of the mechanism are that there shall be a receptacle for the coffee-berries, and the berries in said receptacle may be exposed to an excess of air-pressure, and that the air-pressure may be reduced. Incidentally I provide for heating or cooling the air which is conveyed to the coffee-berries, and a proper condition as to moisture may also be attained. The temperature in the receptacle never reaches a roasting or cooking temperature while my process of ripening or aging goes on. The temperature varies with different qualities of coffee and with different atmospheric conditions, but must always be less than a roasting temperature, and careful observation is required whenever a temperature above 150° is employed, which should be the exception. Very good results can be had at temperatures from 40° to 80° Fahrenheit, although about 100° Fahrenheit gives good results in many cases.

In Fig. 2, O O are supposed to represent sacks of raw coffee, the sacks being such as are usually used for shipment and storage of coffee. Any convenient number of sacks may be inclosed in the receptacle. The manholes B B' and the escape-pipe F are closed, and by means of pipe D an atmospheric pressure which may be as great as three times the normal atmospheric pressure is introduced. The air must not be so moist as to moisten the coffee-berries to any considerable extent and is preferably dry and warm or hot, but not so hot as to cook or roast the coffee-berries. The berries are subjected to such pressure for some hours, more or less, according to the quality of coffee, atmospheric conditions, &c. After the compressed air shall have acted on the coffee (and it will of course easily penetrate the sacks) the excess of air is withdrawn, as by pipe F, and the air may be pumped from the receptacle until there is a partial vacuum therein. The escape of air carries with it considerable dust and also much of any deleterious aroma the coffee may have absorbed—such as the aroma of oils, spices, or other matters with which the coffee may have been shipped—it being well known that coffee frequently absorbs deleterious flavors in shipment.

I prefer to alternate atmospheric pressure and vacuum and partial vacuum treatment for longer or shorter intervals of time, according to the circumstances of the case, until the berries shall have been exposed to this alternation of pressure for several days. The effect as to coloring, ripening, seasoning, deodorizing, and purifying coffee of a few days of such treatment is greater than months or years of mere atmospheric exposure at normal atmospheric pressure.

My method and mechanism are capable of such great modification in detail that I make no attempt at explanation of all the modifications, but explain the general features, so that an expert in handling coffee can carry out the invention under conditions suited to the circumstances of the case.

I am aware that it is common to expose coffee in the process of roasting to a slight steam-pressure and that hot air under pressure has been applied to coffee in the process of roasting. My invention has no relation to the process of roasting, but relates to the ripening, seasoning, and purifying of the raw commercial coffee.

What I claim is—

1. The process of ripening or seasoning raw coffee, which consists in subjecting the same in a closed chamber to dry air at a temperature which will ripen but not cook the coffee, and under pressure in excess of ordinary atmospheric pressure, then reducing such pressure, substantially as described.

2. The process of ripening or seasoning coffee, which consists in subjecting the berries for a given time in a closed chamber to dry and warm air at a temperature which will ripen but not cook the berries, and under pressure of two to three atmospheres, and then reducing the pressure to below the normal, substantially as described.

3. The process of ripening or seasoning coffee, which consists in exposing the same in a closed chamber to dry and warm air at a temperature which will ripen but not cook the coffee, and then to a partial vacuum, repeating the steps at determined intervals, until the desired degree of ripeness is attained, substantially as described.

In testimony whereof I affix my signature in presence of two witnesses.

T. R. TIMBY.

Witnesses:
    CHAS. K. DAVIES,
    J. J. NELLIGAN.